Figure 1:
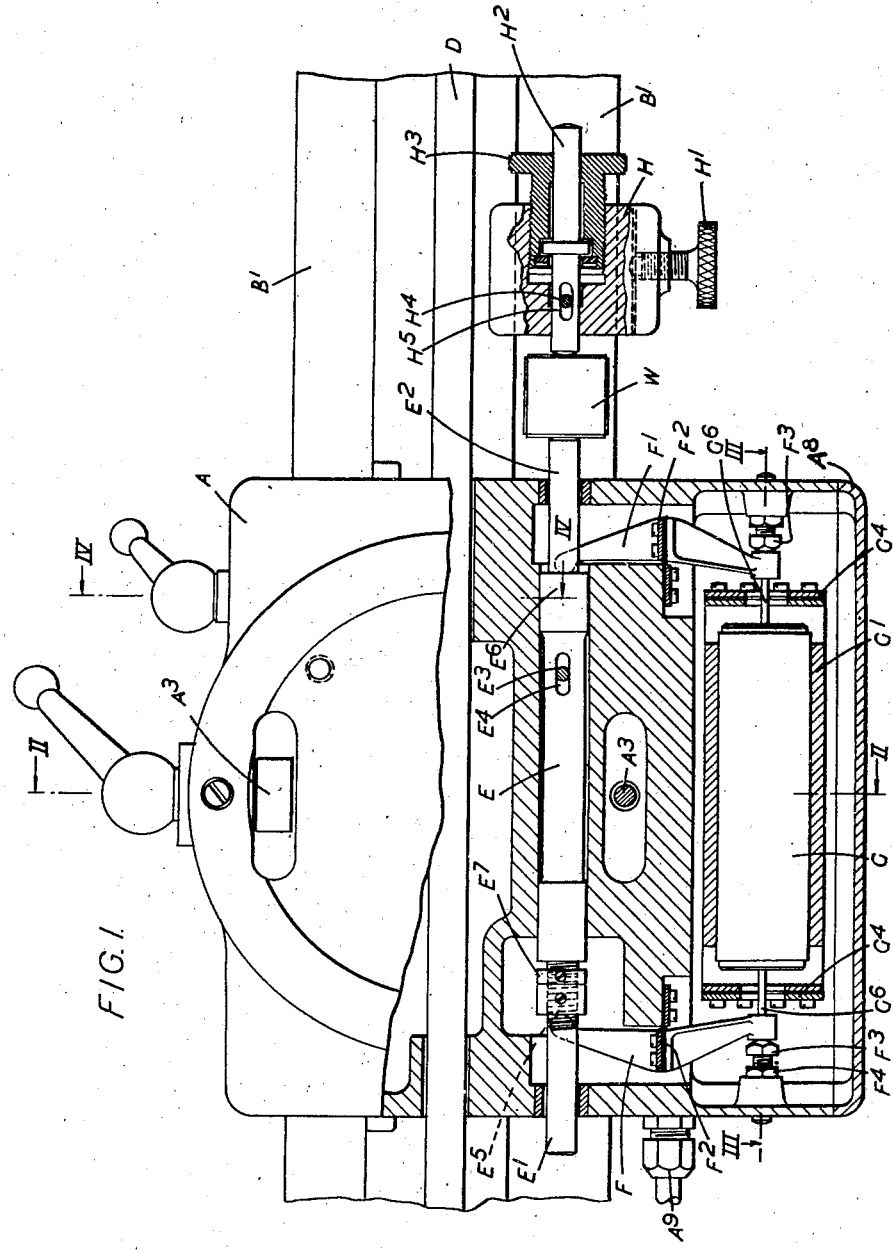

Dec. 3, 1946.  E. A. COOKE  2,412,127
LINEAR DIMENSION GAUGE
Filed July 5, 1944  4 Sheets-Sheet 2

Inventor
ERNEST ALBERT COOKE
By
Emery Holcombe + Blair
Attorney

Dec. 3, 1946.                     E. A. COOKE                         2,412,127
                              LINEAR DIMENSION GAUGE
                    Filed July 5, 1944            4 Sheets-Sheet 3

Inventor
ERNEST ALBERT COOKE
By
Emery Holcombe + Blair
Attorney

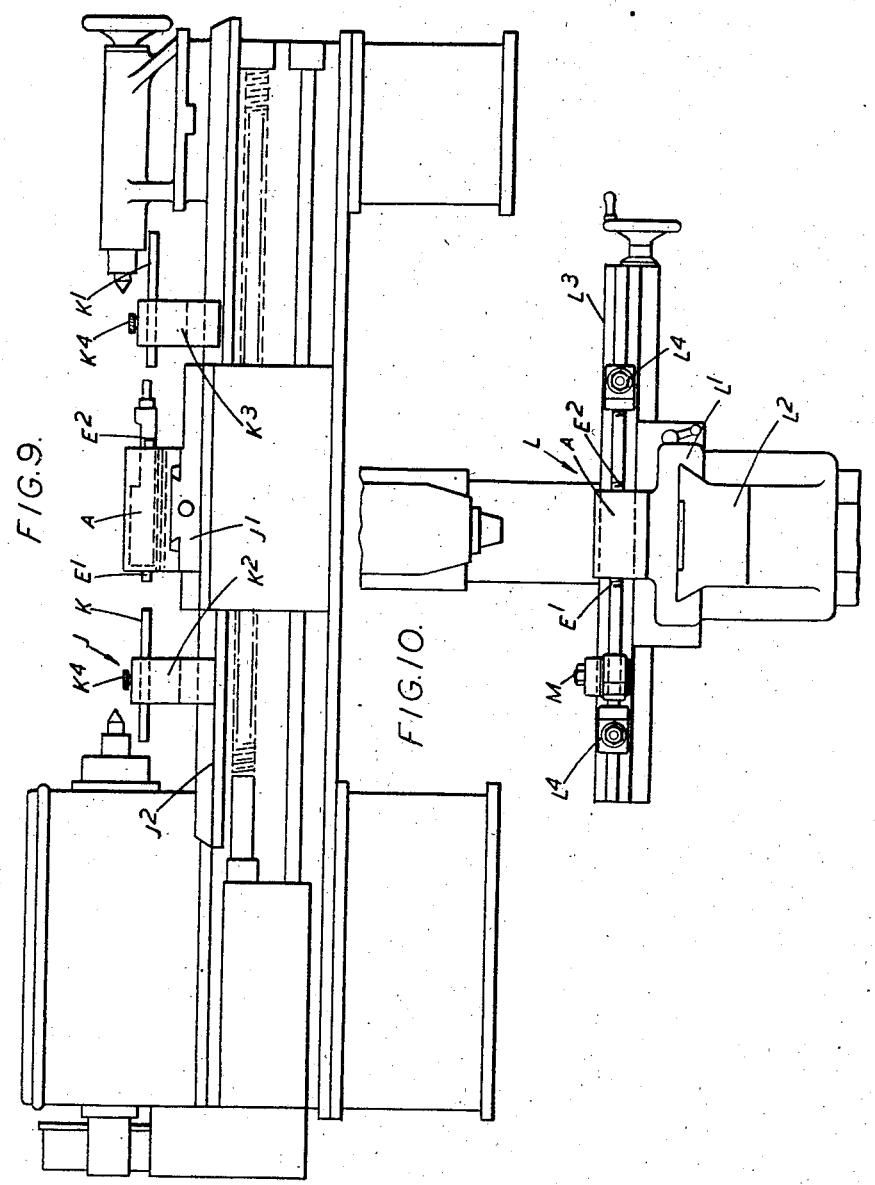

Patented Dec. 3, 1946

2,412,127

UNITED STATES PATENT OFFICE 2,412,127

LINEAR DIMENSION GAUGE

Ernest Albert Cooke, Leicester, England, assignor to Taylor, Taylor & Hobson Limited, Leicester, England, a company of Great Britain Application July 5, 1944, Serial No. 543,536
In Great Britain July 14, 1943

18 Claims. (Cl. 33—147)

This invention relates to linear dimension gauges of the kind comprising a gauge body having a feeler member or finger whose movement relatively to the gauge body causes relative movement of two elements which control an indicating and/or recording instrument in accordance with the said relative movement of the two control elements.

An object of the invention is to provide an improved construction of such gauge whereby measurements can be effected at will on one side or the other of a central point or zero without modification of the gauge itself or of its mounting.

To this end, in a linear dimension gauge according to the invention the feeler member actuates the two control elements through two rocking levers respectively, the arrangement being such that when the feeler member moves in one direction or the other to turn either lever about its fulcrum, thus causing movement of the associated control element, simultaneous movement of the second control element is prevented by an abutment.

Further objects of the invention will be apparent from the following description of the accompanying drawings and from the appended claims. The gauge may be used vertically or horizontally but in the example shown in the drawings the gauge is adapted for horizontal use.

Figure 2:
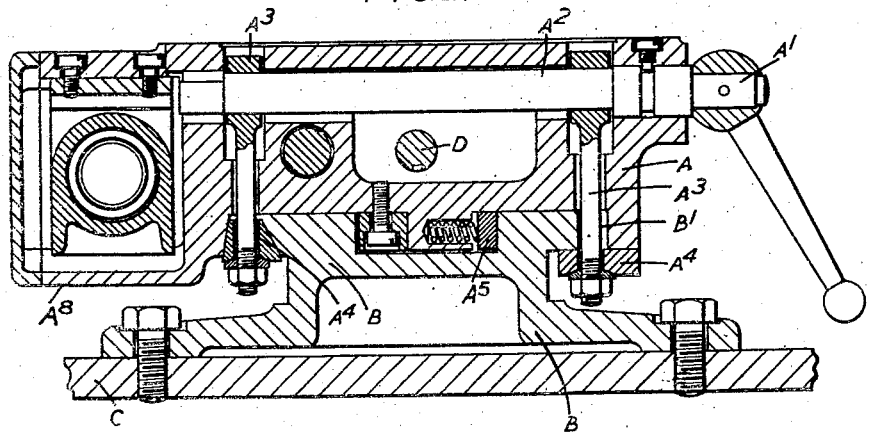
Figure 3:
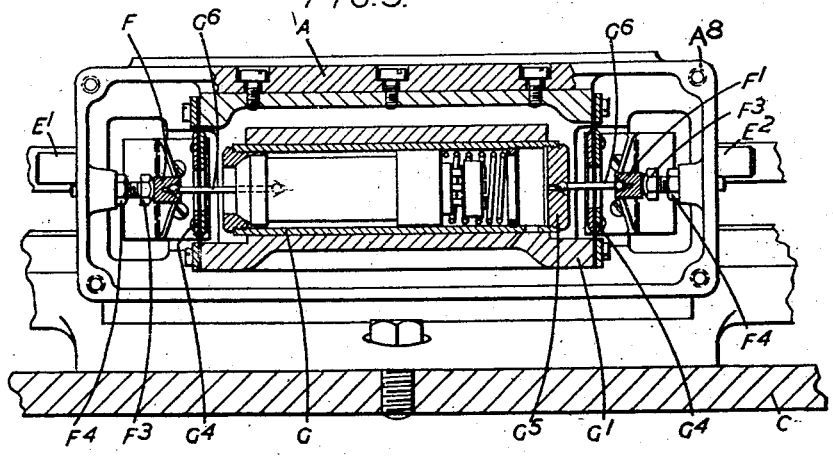
Figure 4:
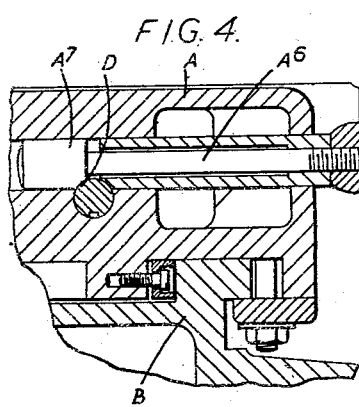
Figure 5:
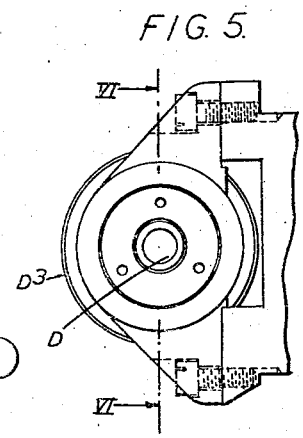
Figure 6:
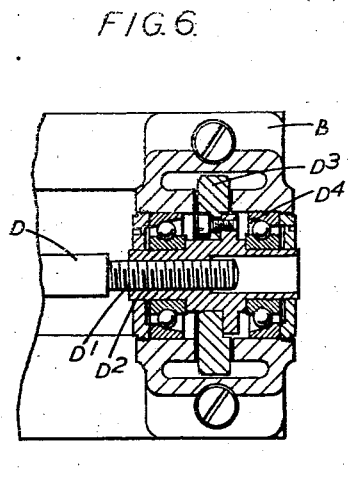
Figure 7:
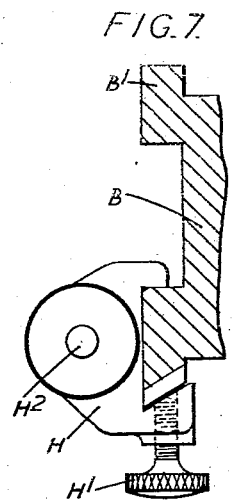
Figure 8:
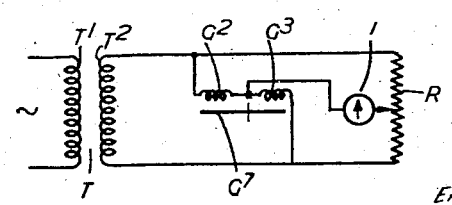

In the drawings,

Figure 1 shows the gauge in plan, part only of the supporting base being shown whilst a portion of the gauge body is illustrated in section, Figure 2 is a section on the line II—II of Figure 1, Figure 3 is a section on the line III—III of Figure 1, Figure 4 is a section on the line IV—IV of Figure 1, Figure 5 illustrates the base in end elevation, Figure 6 is a section on the line VI—VI of Figure 5, Figure 7 shows the adjustable gauge block or anvil as viewed from right to left of Figure 1 and Figure 8 is a diagrammatic representation of the control circuit associated with the electromagnetic control device.

Figure 9 shows a lathe, in side elevation, with a gauge according to the invention mounted thereon, and Figure 10 is a front elevation of a milling machine having the gauge arranged adjacent to the table.

In the construction shown, the gauge body A is mounted to slide along a horizontal base B carried on the top of a supporting table or pedestal, part of which is shown at C in Figures 2 and 3. Mounted to turn in the gauge body A, and extending transversely to the length of the guides $B^1$ on the base B, is a locking spindle $A^1$ having an eccentric portion $A^2$ which engages two tension studs $A^3$ acting on jibs $A^4$ which bear against the under surface of the guides $B^1$ as clearly shown in Figure 2. The gauge body A can thus be locked to the guides $B^1$ in any position of adjustment along such guides. In order to prevent disturbance of this adjustment due to shake while the jibs $A^4$ are out of engagement with the guides $B^1$, a supplementary jib $A^5$ is provided which is spring-pressed against the guides $B^1$. Extending throughout the length of the guides $B^1$ and slideable in opposite ends thereof is a draw-bar D which passes freely through the gauge body A and is furnished at one end with a screwthreaded portion $D^1$ (Figure 6) engaged by an internally screwthreaded nipple $D^2$ to which is secured a knurled ring $D^3$. Thus, rotation of the ring $D^3$ causes the nipple $D^2$ to turn about the axis of the bar D and, at the same time, to act axially through a thrust bearing $D^4$ on the base B. The draw-bar D is thus axially adjusted, that is to say parallel to the guides $B^1$. The gauge body carries a second locking spindle $A^6$ which is axially movable in the gauge body A and has an abutment $A^7$ formed thereon for engaging the draw-bar D, as shown in Figure 4, so that the gauge body A can be locked to the bar D in any position of adjustment along the bar.

Extending through the gauge body A and longitudinally movable therein in the direction of the length of the guides $B^1$ and draw-bar D, is a feeler member E constituted by a rod whose two ends $E^1$, $E^2$ which constitute feeler points, project from opposite sides of the gauge body A respectively, the longitudinal movement of the feeler rod E relatively to the gauge body A being limited by a transverse pin $E^3$ carried by the gauge body and extending through a slot $E^4$ in the feeler rod E. The rod E has, longitudinally spaced apart thereon, two abutments $E^5$, $E^6$ in the form of radial flanges, the flange $E^5$ being in screwthreaded engagement with the rod E so that the axial spacing of the abutments $E^5$, $E^6$ can be initially adjusted and firmly secured in the position of adjustment by a locking ring $E^7$. The two abutments $E^5$, $E^6$ cooperate respectively with the adjacent ends of two rocking levers F, $F^1$ each of which is connected to the gauge body A by a spring ligament $F^2$, the ends of the levers which cooperate with the abutments $E^5$, $E^6$ being rounded so as to make substantially point-sliding contact at the points of engagement as shown in Figure 1.

Arranged within a casing $A^8$ constituting part of the gauge body A is an electromagnetic control device for actuating an indicating instrument I arranged, say, on the table C, or at some other convenient point, and connected to the control device through flexible leads extending through the casing $A^8$ as indicated by the nipple $A^9$. The electromagnetic control device is in the form of a cylindrical unit comprising a tubular outer casing G longitudinally slidable within a supporting cradle $G^1$ and carrying therein two balanced coils $G^2$, $G^3$ (Figure 8). The cradle $G^1$ is supported from the gauge body A by two parallel spring ligaments $G^4$ so that whilst the control device is free, within limits, to move relatively to the gauge body A the cradle $G^1$ will always remain with its longitudinal axis parallel to the length of the feeler rod E. One end of the tubular casing G has an end cap $G^5$ provided with a central conical recess (Figure 3) which constitutes a seating for one end of a ball-ended tappet rod $G^6$, the ball at the other end of this tappet engaging a similar conical recess in the adjacent end of the lever $F^1$. In alignment with the conical recess in the lever $F^1$, but on that side thereof remote from the recess, is a fixed abutment in the form of a round headed stud $F^3$ in screwthreaded engagement with the casing $A^8$ so that the stud $F^3$ can be adjusted as required, and locked in the position of adjustment by the associated lock nut $F^4$. At the other end of the control device an armature $G^7$, cooperating with the coils $G^2$, $G^3$, is similarly connected through a tappet rod $G^6$ to the lever F which is also provided with an abutment stud $F^3$.

The electromagnetic control device is energised from a transformer T whose primary $T^1$ is supplied with power from a suitable a. c. source whilst the coils $G^2$, $G^3$ are arranged in the secondary circuit $T^2$, the instrument I being connected from the mid-point between the coils $G^2$, $G^3$ to a tapping on a resistance R.

Though the feeler rod E may cooperate at one or each end with an anvil fixed relatively to the guide base B, the work to be measured being arranged between the anvil and the associated end of the feeler rod E, it is preferred to provide an abutment block adjustable along the base B, or along a guide arranged on the table C and parallel to the guides $B^1$. To this end, in the construction shown in the drawings an abutment block H furnished with guide surfaces for engaging one of the guides $B^1$, as shown in Figure 7, has a locking stud $H^1$ by which the block H can be locked to the associated guide $B^1$ in any desired position of adjustment along this guide. The block H also carries a stop spindle $H^2$ which is longitudinally adjustable relatively to the block H by means of a micrometer head $H^3$. A pin $H^4$ carried by the block H, and engaging a longitudinal slot $H^5$ in the stop spindle $H^2$, serves to limit the range of adjustment of this spindle relatively to the block H. When the block H is in position on the base B, on one side or the other of the gauge body A, the spindle $H^2$ lies in alignment with the corresponding end $E^1$ or $E^2$ of the feeler rod E.

Basic or initial setting of the gauge is effected by adjusting the spacing between the feeler rod abutments $E^5$, $E^6$ so that, with the rod E in its central position of longitudinal adjustment the levers F, $F^1$ lie in their normal or zero positions about their fulcrums and bear, at their opposite ends, against the abutments $E^5$, $E^6$ and against the associated fixed abutment studs $F^3$, the indicating instrument I then reading zero.

The gauge may be used in various ways to suit requirements. According to one method, the gauge body A is locked to the base B by means of the locking spindle $A^2$, and the abutment block H is coarsely adjusted along the associated guide $B^1$ until the stop spindle $H^2$ bears against the adjacent end $E^1$ or $E^2$ of the rod E, according to which side of the gauge body A the abutment block is arranged as may prove the more convenient. Having locked the block H in position by means of the stud $H^1$, the stop spindle $H^2$ is adjusted by means of the micrometer head $H^3$ until the indicating instrument I reads zero. By inserting the work W to be measured between the spindle $H^2$ and the cooperating end of the feeler rod E, as indicated in Figure 1, the dimension of the work will be accurately indicated on the indicating instrument I since the movement of the armature $G^7$ relatively to the coils $G^2$, $G^3$ will cause a corresponding alteration in the reluctance of the two magnetic circuits formed by the cores of the coils.

It will be seen that as one of the levers (say, the lever F) turns about its fulcrum to cause adjustment of the associated element of the control device (say the armature $G^7$) simultaneous angular movement of the other lever ($F^1$) in the same sense is prevented by the associated abutment stud $F^3$ so that this second lever acts as an abutment. If however, the block H were used on the other side of the gauge body, the second lever would be turned about its fulcrum whilst the first lever would act as a fixed abutment. Further, though by reason of the finite lengths of the lever F, $F^1$ the path of movement of the point of application of each lever with the feeler rod E and the associated control element will be arcuate, that is to say out of parallelism with the longitudinal movement of the feeler rod E, the relative adjustment of the control elements (i. e. the armature and the coils) will be truly parallel to the movement of the feeler rod since the control device, being supported by the parallel spring ligaments $G^4$, will always remain parallel to the length of the feeler rod E. The rolling engagement between the control elements and the tappet rods $G^6$ as also between the abutments $E^5$, $E^6$ and the associated ends of the levers F, $F^1$, allow for the slight transverse displacement of the control device relatively to the rod E.

By mounting the levers F, $F^1$ on the spring ligaments $F^2$, and providing a similar support for the control elements (as a single unit), whilst maintaining point-sliding contacts between each of the levers F, $F^1$ and the parts engaged thereby, friction between moving parts is reduced to a minimum and inaccuracies due to friction are thus substantially eliminated.

As will be readily appreciated, instead of or in addition to the fine adjustment effected by the stop spindle $H^2$, zeroing of the gauge prior to making a measurement may be effected by releasing the tension on the studs $A^3$ and locking the gauge body to the draw bar D by operating the spindle $A^6$, the draw bar D being then adjusted by the knurled ring $D^3$ so as to effect fine adjustment of the gauge body A relatively to the abutment block H whereupon the spindle $A^2$ is operated to relock the gauge body A to the base B.

By providing an abutment block, such as the block H, on both sides of the gauge body A simultaneously, the gauge may be employed for purposes of comparing work with an accurately finished sample. To this end the sample is positioned between one abutment block and the adjacent end of the feeler rod, this block locked to the guides B¹ and the stop spindle H² thereof (and/or the draw-bar D) adjusted until the indicating instrument I reads zero, whereupon the gauge body A is locked to the guides B¹. The second abutment block is now adjusted until the stop spindle H² thereof bears firmly against the adjacent end of the feeler rod E, the second abutment block being then firmly locked to the guide B¹. If this results in the reading on the instrument I altering from zero, which may occur due to the feeler rod E not making a firm contact with the sample, the gauge body A is released from the guides B¹ and locked to the draw bar D which is then adjusted, by the ring D³, until the instrument I reads zero. The gauge body A is then locked to the guides B¹ and the sample is removed for substitution of the work W to be compared therewith, the second abutment block being preferably adjusted away from the gauge body A. Since this arrangement will only indicate divergencies which are in excess of the dimension of the sample, the second abutment block may incorporate a spring between the stop spindle and the body of the abutment block and this block left in position with the spring under slight compression.

In Figure 9 the gauge A is mounted on the cross-slide J¹ of a lathe J, cooperating bars K, K¹ being arranged in brackets K², K³ carried by the lathe bed J². The bars K, K¹ are longitudinally adjustable in the brackets and can be locked thereto by studs K⁴, the brackets K², K³ being individually adjustable along the lathe bed J².

In Figure 10 the gauge A is mounted on a bracket L¹ carried by the cross-slide L² of a milling machine L. A slip gauge carrier M, is adjustable along the table L³ relatively to the abutments L⁴ which are individually adjustable along the table.

It will be understood that the construction more specifically described above is given by way of example only and that details of construction and method of use will vary to suit requirements. For example, though reverse operation of the gauge is most conveniently effected by actuation of the feeler member from opposite ends respectively when the gauge is employed horizontally, measurements in opposite directions may be effected vertically by biassing the feeler member in the downward direction by a spring, so that, for example, the thickness of a work-piece may be measured against the action of the biassing spring whilst the depth of a depression or aperture in the work-piece may be measured under the action of the spring. Moreover, instead of one rocking lever acting, in effect, as a fixed abutment for the associated control element while the other control element is being operated, each control element may cooperate with an associated abutment through a suitable thrust member relatively to which the corresponding rocking lever can move to actuate the associated control member in the direction away from the abutment.

The gauge according to the invention is more particularly suitable for use in connection with machine tools. For example, the gauge body may be carried on the apron of a lathe and utilized for accurate measurement and checking during the operation of turning between shoulders. According to another use, the gauge may be supported by a bracket on the knee of a milling machine.

What I claim as my invention and declare to secure by Letters Patent is:

1. A linear dimension gauge comprising a gauge body, a feeler rod carried by the gauge body and longitudinally movable relatively thereto, two transverse abutments longitudinally spaced apart on the feeler rod, two relatively movable control elements carried by the gauge body, means whereby an indicating instrument is actuated in accordance with relative movement of the control elements, two rocking levers carried by the gauge body and through which movement is transmitted from the transverse abutments on the feeler rod to the two control elements respectively, and two abutments associated respectively with the levers and each comprising a stop which permits movement of the associated lever in one direction only, from a normal static position, the directions of permissible angular movements of the two levers being relatively reversed.

2. A linear dimension gauge comprising a gauge body, a feeler member carried by the gauge body and movable relatively thereto, two relatively movable control elements carried by the gauge body, means whereby an indicating instrument is actuated in accordance with relative movement of the control elements, two rocking levers supported from the gauge body by spring ligaments and through which movement is transmitted from the feeler member to the two control elements respectively, and two abutments associated respectively with the levers and each comprising a stop which permits movement of the associated lever in one direction only, from a normal static position, the directions of permissible angular movements of the two levers being relatively reversed.

3. A linear dimension gauge comprising a gauge body, a feeler rod carried by the gauge body and longitudinally movable relatively thereto, two transverse abutments longitudinally spaced apart on the feeler rod, two relatively movable control elements carried by the gauge body, means whereby an indicating instrument is actuated in accordance with relative movement of the control elements, two rocking levers each supported from the gauge body by a spring ligament and through which levers movement is transmitted from the transverse abutments on the feeler rod to the two control elements respectively, and two abutments associated respectively with the two levers, movement of the feeler rod in one direction or the other causing one lever to turn about its fulcrum thus causing movement of the associated control element whilst simultaneous movement of the other control element is prevented by the associated abutment.

4. A linear dimension gauge comprising a gauge body, a feeler member carried by the gauge body and movable relatively thereto, two relatively movable control elements supported, as a unit, from the gauge body by parallel spring ligaments, means whereby an indicating instrument is actuated in accordance with relative movement of the control elements, two rocking levers carried by the gauge body and through which movement is transmitted from the feeler member to the two control elements respectively, two abutments associated with the two levers respectively and each comprising a stop which permits angular movement of the lever in one direction only, from a normal static position, the directions of permissible angular movements of the two levers being relatively reversed, movement of the feeler member in one direction or the other causing one lever to turn about its fulcrum thus causing movement of the associated control element whilst simultaneous movement of the other control element is prevented by the corresponding abutment.

5. A linear dimension gauge comprising a gauge body, a feeler member carried by the gauge body and movable relatively thereto, two relatively movable control elements supported from the gauge body, as a unit, by parallel spring ligaments transverse to the direction of movement of the feeler member and to the direction of relative movement of the control elements, means whereby an indicating instrument is actuated in accordance with relative movement of the control elements, two rocking levers supported from the gauge body by spring ligaments and through which movement is transmitted from the feeler member to the two control elements respectively, abutments associated with said levers and each comprising a stop which permits angular movement of the lever in one direction only, from a normal static position, the directions of permissible angular movements of the two levers being relatively reversed, and point-sliding connections through which the actuating force is transmitted to each control element and to each lever.

6. A linear dimension gauge comprising a gauge body, a feeler member carried by the gauge body and movable relatively thereto, an electromagnetic device carried by the gauge body and comprising two control elements, namely a coil element and an armature element which are movable relatively to each other, means whereby an indicating instrument is actuated in accordance with relative movement of the two control elements, two rocking levers carried by the gauge body and through which movement is transmitted from the feeler member to the two control elements respectively, and abutments associated with the two levers respectively, movement of the feeler member in one direction or the other causing one lever to turn about its fulcrum thus causing movement of the associated control element whilst simultaneous movement of the other control element is prevented by the associated abutment.

7. A linear dimension gauge as claimed in claim 5, in which the two relatively movable control elements are constituted respectively by the coil element and the armature element of an electromagnetic device for controlling the indicating instrument.

8. A linear dimension gauge comprising a support or base, a guide carried by said base, a gauge body adjustable along said guide, means for locking the gauge body to the guide in any desired position of adjustment along the guide, a feeler rod carried by the gauge body and movable relatively thereto in a direction parallel to said guide, two transverse abutments longitudinally spaced apart on the feeler rod, an electromagnetic device for controlling an indicating instrument and supported from the gauge body by parallel spring ligaments transverse to the feeler rod, two control elements, namely a coil element and an armature element, constituting part of said control device and movable relatively to each other, two rocking levers supported from the gauge body by spring ligaments transverse to the levers through which movement is transmitted from the abutments on the feeler rod to the coil element and armature element respectively, abutments associated with the two levers and each comprising a stop which permits angular movement of the lever in one direction only, from a normal static position, the directions of permissable angular movements of the two levers being relatively reversed, and point-sliding connections between the levers and the feeler element, coil element, armature element and abutments.

9. A linear dimension gauge comprising a support or base, a gauge body adjustable along said base, a spindle carried by the base, means for adjusting the spindle longitudinally, a device for locking the gauge body to the spindle in any desired position of adjustment thereon, a feeler member carried by the gauge body and movable relatively thereto, two relatively movable control elements carried by the gauge body, means whereby an indicating instrument is actuated in accordance with relative movement of the control elements, two rocking levers carried by the gauge body and through which movement is transmitted from the feeler member to the two control elements respectively, and two abutments associated with the control elements respectively and each comprising a stop which permits angular movement of the lever in one direction only, from a normal static position, the directions of permissible angular movements of the two levers being relatively reversed, movement of the feeler member in one direction or the other causing one lever to turn about its fulcrum thus causing movement of the associated control element whilst simultaneous movement of the other control element is prevented by the associated abutment.

10. A linear dimension gauge as claimed in in claim 8, in which the gauge body is adjusted along the guide on the base by a spindle carried by the base, and means are provided for locking the gauge body to the spindle in any desired position of adjustment of the gauge body along said guide.

11. A linear dimension gauge as claimed in claim 8, in which the gauge body is adjustable along a guide on the base by a spindle carried by the base, means being provided for locking the gauge body to the spindle in any desired position of adjustment thereon, and the feeler member is engaged by an abutment member carried by and adjustable on the base relatively to the gauge body.

12. A linear dimension gauge as claimed in claim 9, in which the feeler member is engaged by a stop supported by an abutment block carried by and adjustable on the base relatively to the gauge body, the stop being adjustable on the abutment block.

13. A linear dimension gauge as claimed in claim 8, in which the gauge body is adjustable along a guide on the base, by a spindle carried by the base, means being provided for locking the gauge body to the spindle in any desired position of adjustment thereon, and the feeler member is engaged by an adjustable stop on a gauge block carried by and adjustable on the base relatively to the gauge body.

14. A linear dimension gauge as claimed in claim 9, in which the feeler member projects at each of its two ends from the gauge body, and an abutment member is carried by and adjustable on the base relatively to the gauge body on either side thereof so as to engage one end or the other of the feeler member.

15. A linear dimension gauge as claimed in claim 8, in which the gauge body is adjustable along a guide on the base by a spindle carried by the base, means being provided for locking the gauge body to the spindle in any desired position of adjustment thereon, and the feeler rod projects at each of its two ends from the gauge body, and an abutment member being carried by and adjustable on the base so as to engage one end or the other of the feeler member.

16. A linear dimension gauge comprising a supporting base or table, guides carried by said table, a gauge body carried by and adjustable along said guides, means for locking the gauge body to the guides in any desired position of adjustment along the guides, a feeler rod carried by the gauge body and longitudinally movable relatively thereto in a direction parallel to the guides, two transverse abutments longitudinally spaced apart on the feeler rod, one of which abutments is longitudinally adjustable on the feeler rod, means for locking said adjustable abutment in position on the feeler rod at the desired spacing of said transverse abutments, an electromagnetic device for controlling an indicating instrument and supported from the gauge body by parallel spring ligaments transverse to the length of the feeler rod, two balanced coils constituting one element of the said control device, an armature constituting the second element of the control device and coaxial with the first element these elements being movable relatively to each other thereby causing variation in the reluctance of the magnetic circuits of the coils and actuating the instrument accordingly, two rocking levers supported from the gauge body by spring ligaments transverse to the levers through which movement is transmitted from the transverse abutments on the feeler rod to the coil element and armature element respectively two adjustable abutment studs carried by the gauge body and associated with the two rocking levers respectively in alignment with the axis of the two control elements, each abutment stud permitting angular movement of the associated lever in one direction only, from a normal static position, the directions of permissible angular movement of the two levers being relatively reversed, point-sliding connections between the levers and the control elements, abutment studs and transverse abutments on the feeler rod, a spindle carried by the supporting base parallel to the guides thereon, means for adjusting said spindle longitudinally relatively to the supporting base, a device for locking the gauge body to said spindle at will, an abutment block carried by one of the guides on the supporting base and adjustable along said guide, means for locking the abutment block to said guide in any desired position on either side of the gauge body and an adjustable stop carried by the abutment block and lying in alignment with one end or the other of the feeler rod according to whether said block is disposed on one side or the other of the gauge body.

17. A linear dimension gauge comprising a gauge body, a feeler member carried by the gauge body and translationally movable relatively thereto, two rocking levers carried by the gauge body and extending transversely to the direction of movement of the feeler member, two abutments on the feeler member which engage the two end portions of the levers lying more adjacent to the feeler member, two control elements carried by the gauge body, said elements being relatively movable in directions parallel to the movement of the feeler member, operative connecting means between the two control elements respectively and the two end portions of the levers lying more remote from the feeler member, two stops carried by the gauge block in alignment with the two end portions respectively of the levers lying more remote from the feeler member, and means whereby an indicating instrument is actuated in accordance with the said relative movements of the control elements, movement of the feeler member in one direction or the other causing one lever to turn about its fulcrum thus causing movement of the associated control element whilst simultaneous movement of the other control element is prevented by the corresponding lever bearing against its associated stop.

18. A linear dimension gauge comprising a gauge body, a feeler member carried by the gauge body and translationally movable relatively thereto, two rocking levers carried on the gauge body by parallel spring ligaments and extending transversely to the direction of translational movement of the feeler member, two abutments on the feeler member which engage the two end portions of the lever lying more adjacent to the feeler member, two control elements, a cradle supporting the two control elements as a unit, parallel spring ligaments connecting said cradle to the gauge body, the cradle and control elements being thus movable as a unit in directions generally parallel to the direction of movement of the feeler member whilst the control elements are movable relatively to each other and to the cradle in said directions, operative connecting means between the two control elements respectively and the two end portions of the levers lying more remote from the feeler member, two stops carried by the gauge body in alignment with the two end portions respectively of the levers lying more remote from the feeler member, and means whereby an indicating instrument is actuated in accordance with the said relative movements of the control elements, movement of the feeler member in one direction or the other causing one lever to turn about its fulcrum thus causing movement of the associated control element whilst simultaneous movement of the other control element is prevented by the corresponding lever bearing against its associated stop.

ERNEST ALBERT COOKE.